(12) United States Patent
Smith

(10) Patent No.: US 7,945,745 B2
(45) Date of Patent: May 17, 2011

(54) METHODS AND SYSTEMS FOR EXCHANGING DATA

(75) Inventor: Glenn Smith, Ruckersville, VA (US)

(73) Assignee: General Electric Company, Schenectady, NY (US)

( * ) Notice: Subject to any disclaimer, the term of this patent is extended or adjusted under 35 U.S.C. 154(b) by 633 days.

(21) Appl. No.: 11/856,210

(22) Filed: Sep. 17, 2007

(65) Prior Publication Data

US 2009/0077324 A1    Mar. 19, 2009

(51) Int. Cl.
*G06F 12/00* (2006.01)

(52) U.S. Cl. ......................................................... 711/156

(58) Field of Classification Search ........................ None
See application file for complete search history.

(56) References Cited

U.S. PATENT DOCUMENTS

| | | | |
|---|---|---|---|
| 4,008,461 A | 2/1977 | Raven | |
| 4,368,511 A | 1/1983 | Imazeki | |
| 4,727,538 A | 2/1988 | Furchtgott et al. | |
| 4,998,245 A | 3/1991 | Tanaka et al. | |
| 5,224,213 A * | 6/1993 | Dieffenderfer et al. | 710/53 |
| 5,353,284 A | 10/1994 | Shiobara | |
| 5,367,650 A | 11/1994 | Sharangpani et al. | |
| 5,740,468 A | 4/1998 | Hirose | |
| 5,959,977 A | 9/1999 | Park | |
| 6,330,961 B1 | 12/2001 | Borja | |
| 6,412,032 B1 | 6/2002 | Neet | |
| 6,516,360 B1 * | 2/2003 | Mohseni et al. | 710/52 |
| 6,779,055 B2 * | 8/2004 | Kim et al. | 710/52 |
| 6,944,728 B2 * | 9/2005 | Calderon et al. | 711/157 |
| 6,985,977 B2 * | 1/2006 | Vrancic | 710/59 |
| 7,243,354 B1 | 7/2007 | Chhabra et al. | |
| 7,254,654 B1 * | 8/2007 | Davis et al. | 710/52 |
| 7,447,812 B1 * | 11/2008 | Mo et al. | 710/52 |

FOREIGN PATENT DOCUMENTS

WO    WO2006/092807    9/2006

OTHER PUBLICATIONS

W. Richard Stevens: "Unix Network Programming, vol. 2, Second Edition: Interprocess Communications" Aug. 27, 1998 Prentice Hall's XP002499807.

* cited by examiner

*Primary Examiner* — Hiep T Nguyen
(74) *Attorney, Agent, or Firm* — Global Patent Operation; Mark A. Conklin

(57) ABSTRACT

A method for exchanging data between a producer and a consumer is provided. The method includes writing the data with the producer without blocking the consumer and without waiting for access to the consumer. The method also includes reading the data with the consumer without blocking the producer and without waiting for access to the producer. The data is exchanged from the producer to the consumer upon reading the data.

18 Claims, 3 Drawing Sheets

METHODS AND SYSTEMS FOR EXCHANGING DATA

BACKGROUND OF THE INVENTION

This invention relates generally to producer/consumer software and, more specifically, to methods and systems for exchanging data between a producer and a consumer.

Generally, I/O scanning mechanisms utilize software implementations that include a producer and a consumer configured to exchange data across a module using shared memory buffers. Further, the data exchange typically requires a handshake mechanism across a backplane to allow access to the data. Specifically, the producer requires access to write the data to the shared memory buffer and the consumer requires access to read the data from the shared memory buffer. Accordingly, during the data exchange, at least some known scanning mechanisms require the producer and/or the consumer to wait for access to the data. Specifically, the handshake mechanism may require multiple read or write accesses. For example, a shared memory semaphore, such as the Peterson Algorithm is commonly implemented to ensure coherent access to a shared memory data buffer. However, such semaphores often require repeated attempts to gain access. Further, some known scanning mechanisms require critical regions or timeouts while one of the producer and/or the consumer catches up with the most recent data. Calculating such wait times or timeouts can be difficult and error prone.

Accordingly, at least some known scanning mechanisms send a command to the scanning module to prepare for controller access. However, this mechanism often requires the module to delay its normal processing to read the command, thereby causing delays in the data exchange. Further, at least some known scanning mechanisms use a hardware mechanism to assist with access control. However, hardware mechanisms can be costly and/or time consuming to install and maintain.

BRIEF DESCRIPTION OF THE INVENTION

In one aspect, a method for exchanging data between a first module and a second module is provided. The method includes generating data at the first module, wherein the first module is configured to allow the second module to substantially continuously access the data. The method also includes reading the data at the second module, wherein the second module configured to allow the first module to substantially continuously generate data. The method finally includes exchanging the data between the first module and the second module upon reading the data.

In another aspect, a system is provided. The system includes a controller and an input/output module that is configured to exchange data with the controller over a shared memory interface. The data is exchanged by generating the data with a first module, reading the data at a second module, and exchanging the data from the first module to the second module upon reading the data. The first module is configured to allow the second module to substantially continuously access the data; and the second module is configured to allow the first module to substantially continuously generate the data.

In yet another aspect, a computer program installed in an input/output module is provided. The computer program includes at least one code segment that is configured to instruct the input/output module to exchange data between a first module and a second module. The data is exchanged by generating data at the first module, wherein the first module is configured to allow the second module to substantially continuously access the data; reading the data at the second module, wherein the second module is configured to allow the first module to substantially continuously generate data; and exchanging the data between the first module and the second module upon reading the data.

DETAILED DESCRIPTION OF THE INVENTION

The present invention provides a system including a controller and an input/output (I/O) module configured to exchange data with the controller over a shared memory interface. In one embodiment, the system includes a computer program that is input into the I/O module and includes an algorithm for exchanging data. The system may also include a processor to read and operate the computer program. The technical effect of the algorithm is to control a producer and a consumer to facilitate exchanging data between the controller and the I/O module. The algorithm enables the producer to asynchronously and coherently write new data without blocking and waiting to coordinate access with the consumer. The consumer also asynchronously reads the most recent producer data without blocking or waiting on the producer for access to the data. In the exemplary embodiment, the system does not require special purpose hardware.

Further, data structures for a producer/consumer exchange includes only a producer status byte, a consumer status byte, and a plurality of distinct data buffer bins, such as 4 distinct data buffer bins. For the producer, the algorithm ensures that at least one of the buffer bins is always available to write the latest production data so that the producer does not wait for access to the consumer. For the consumer, the algorithm enables the consumer to instantly lock the most recently produced data buffer to read the data. In the exemplary embodiment, the algorithm only requires 2 shared memory read/write operations to negotiate access to an appropriate data buffer bin, thereby improving performance when scanning across a backplane.

It should be noted that although the present invention is described with respect to scanning mechanisms, as will be appreciated by one of ordinary skill in the art, the present invention may also apply to any system and/or equipment that exchanges data between a producer and a consumer. Further, although the present invention is described with respect to processors and computer programs, as will be appreciated by one of ordinary skill in the art, the present invention may also apply to any system and/or program that is configured to exchange data between a producer and a consumer. As used herein, the term processor is not limited to just those integrated circuits referred to in the art as processors, but broadly refers to computers, processors, microcontrollers, microcomputers, programmable logic controllers, application specific integrated circuits, and other programmable circuits. The processor may be part of a computer that may include a device, such as; a floppy disk drive or compact disc-read-only memory (CD-ROM) drive, for reading data from a computer-readable medium, such as a floppy disk, a CD-ROM, a magneto-optical disk (MOD), or a digital versatile disc (DVD).

Figure 1:
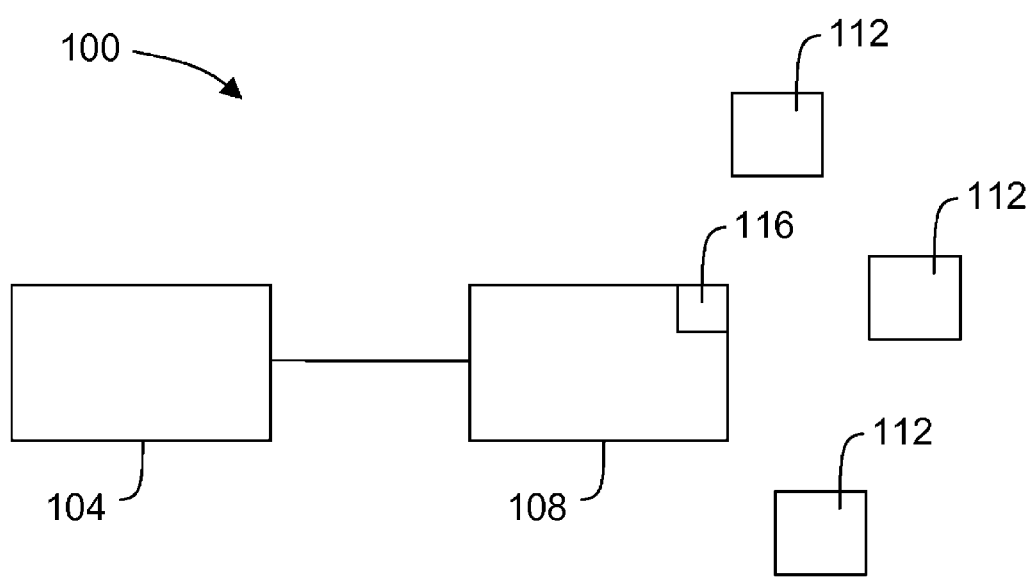
FIG. 1 is an exemplary embodiment of a scanning mechanism that includes a controller and an input/output module.

FIG. 1 is an exemplary embodiment of a scanning mechanism 100 that includes a controller 104 and an I/O module 108. In the exemplary embodiment, I/O module 108 controls I/O data for multiple remote modules 112. Specifically, I/O module 108 implements a shared memory interface and includes a 4-buffer producer/consumer data set for each configured remote module 112. For example, if a user configures a network to include fifty remote modules 112, I/O module 108 provides fifty producer/consumer data sets for input data exchange and an additional fifty producer/consumer data sets for output data exchange to each module 112. Each producer/consumer data set includes a producer status byte, a consumer status byte, and 4 data buffer bins.

In the exemplary embodiment, the scanning mechanism includes an algorithm embodied in a computer program, which enables both a producer to generate new data and a consumer to view and/or read the most recently generated producer data without waiting to negotiate access. Accordingly, the producer and the consumer can operate asynchronously and at any time interval. In one embodiment, a producer cycle is faster than a consumer cycle. In an alternative embodiment, the consumer cycle is faster than the producer cycle. In a further embodiment, the producer and consumer cycles alternate. In each embodiment, neither the producer nor consumer requires any critical regions or timeouts. More specifically, the read/write of shared memory control values for the producer status and the consumer status are not required to be atomic. Accordingly, the producer and consumer access to these values can be concurrent and overlapping. The algorithm minimizes shared memory accesses to optimize performance. Further, the algorithm only requires a single byte write and single byte read of shared memory to negotiate buffer access.

Generally, 4-buffer scanning requires 4 distinct shared memory buffer bins for each producer/consumer combination. Thus, input scanning requires 4 buffer bins and output scanning requires an additional 4 buffer bins. Offset locations of the buffers can be determined during module startup/configuration, such that during actual scan operation the buffers can be referred to simply by buffer index values 0, 1, 2, or 3. For example, a module with 12 bytes of input scan data may locate its 4-buffer set in shared memory at offset 0x10000. In this example, since each input buffer has data size 0x0C, the 4-buffers are located at offsets 0x01000, 0x1000C, 0x10018, and 0x10024. These offsets are then determined during configuration and the 4-buffer scanning index values 0, 1, 2, and 3 are mapped.

Controlling a basic 4-buffer scanning operation requires a minimum of 5 control sub-fields in shared memory. Specifically, four of the control sub-fields are written only by the producer including last cycle value, bin selector, bin0 sub-field, and bin1 sub-field. The remaining control sub-field is cycle value, which is written only by the consumer. Additional fields may be defined to enhance the I/O scan operation.

Generally, the producer and the consumer alternate between bin0 and bin1. Accordingly, during operation, the consumer uses a locked buffer value in one buffer bin while the producer updates the other buffer bin with newly produced buffers. During each production cycle, the producer finds an available I/O scan buffer, writes production data to it, and presents that buffer's index value in shared memory. In one embodiment, the producer writes the newly produced buffer index value to the buffer bin field that is not currently locked by the consumer. Further, the producer reads and saves the consumer cycle value during each production cycle. When the producer sees a consumer cycle value change from the previous production cycle, the producer must switch to the other buffer bin on its next production cycle. Accordingly, if the consumer cycle value changes while the producer is producing to bin0 then the next production will be to bin1. If bin1 was active then the producer switches to bin0. The producer writes a bin selector to indicate which buffer bin it is currently using (either bin0 or bin1). The algorithm allows the producer to constantly switch its buffer bin and bin selector state with each observed consumption cycle. The consumer observes the producer status and picks the most recent production buffer from the locked buffer bin.

The 4-buffer handshake algorithm requires only two shared memory accesses to negotiate the next production/consumption buffer. A third shared memory access is also required the read or write the actual data. Accordingly, the producer must write new data to a free buffer location, write a producer status field with a new buffer index, and read a consumer status field to determine actions for the next production cycle. The consumer writes the new consumer status field to start a consumption cycle, reads the producer status to identify a consumption buffer, and reads data from the consumption buffer.

If only the five control sub-fields are required, the producer and consumer status fields can be reduced to a single byte for each status field. Using a larger DWORD size provides space for buffer bin ready bits to give a buffer valid indication for specific locked buffers. If buffer specific details are not needed these ready bits may be replaced by a mechanism that sets bin0 value equal to bin1 value to indicate that the producer is not ready. Using a DWORD status size also provides spare bits for future enhancements.

Figure 2:
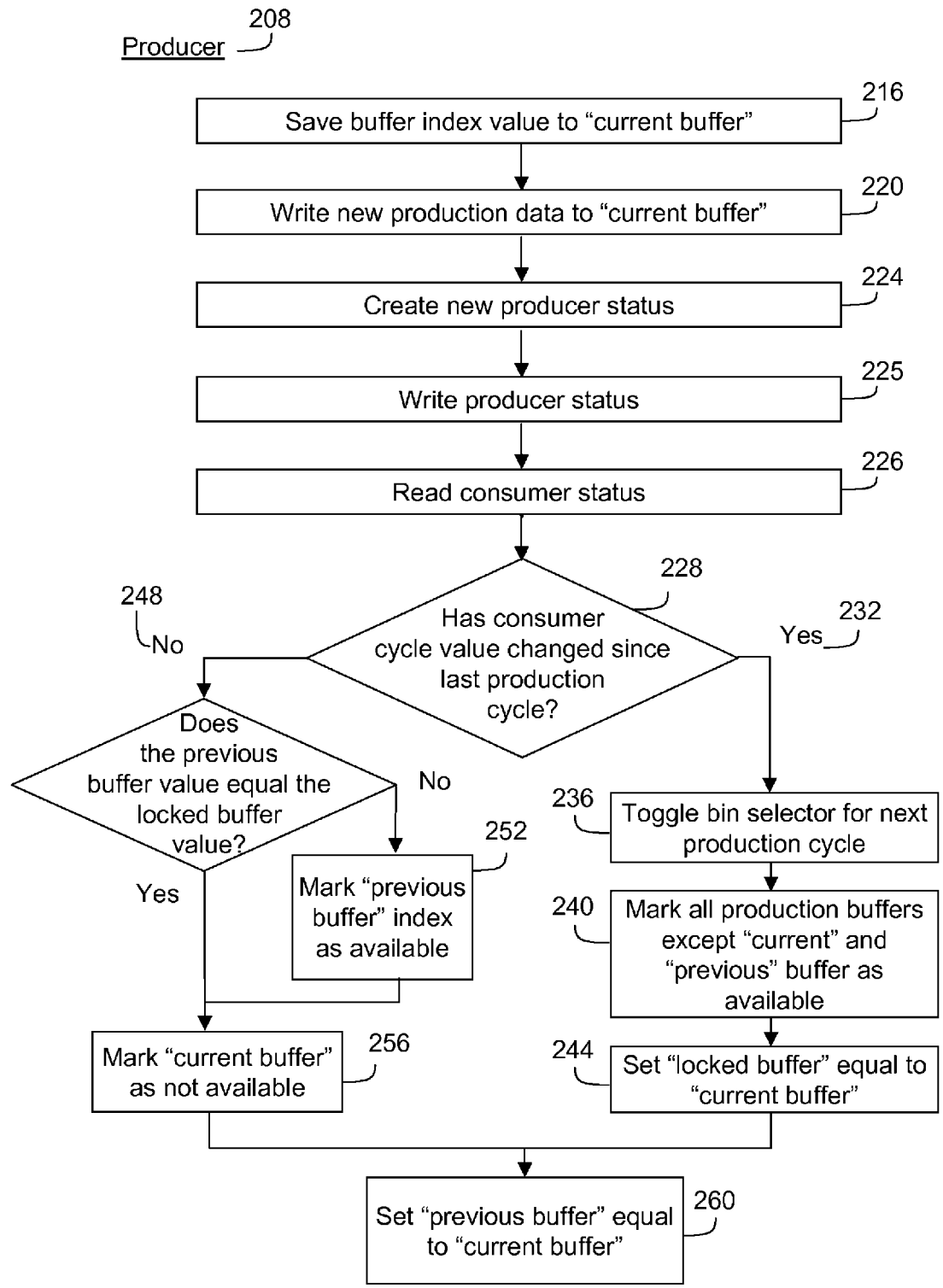
FIGS. 2 and 3 are a flowchart of an exemplary algorithm that may be used to exchange data using the scanning mechanism shown in FIG. 1.
Figure 3:
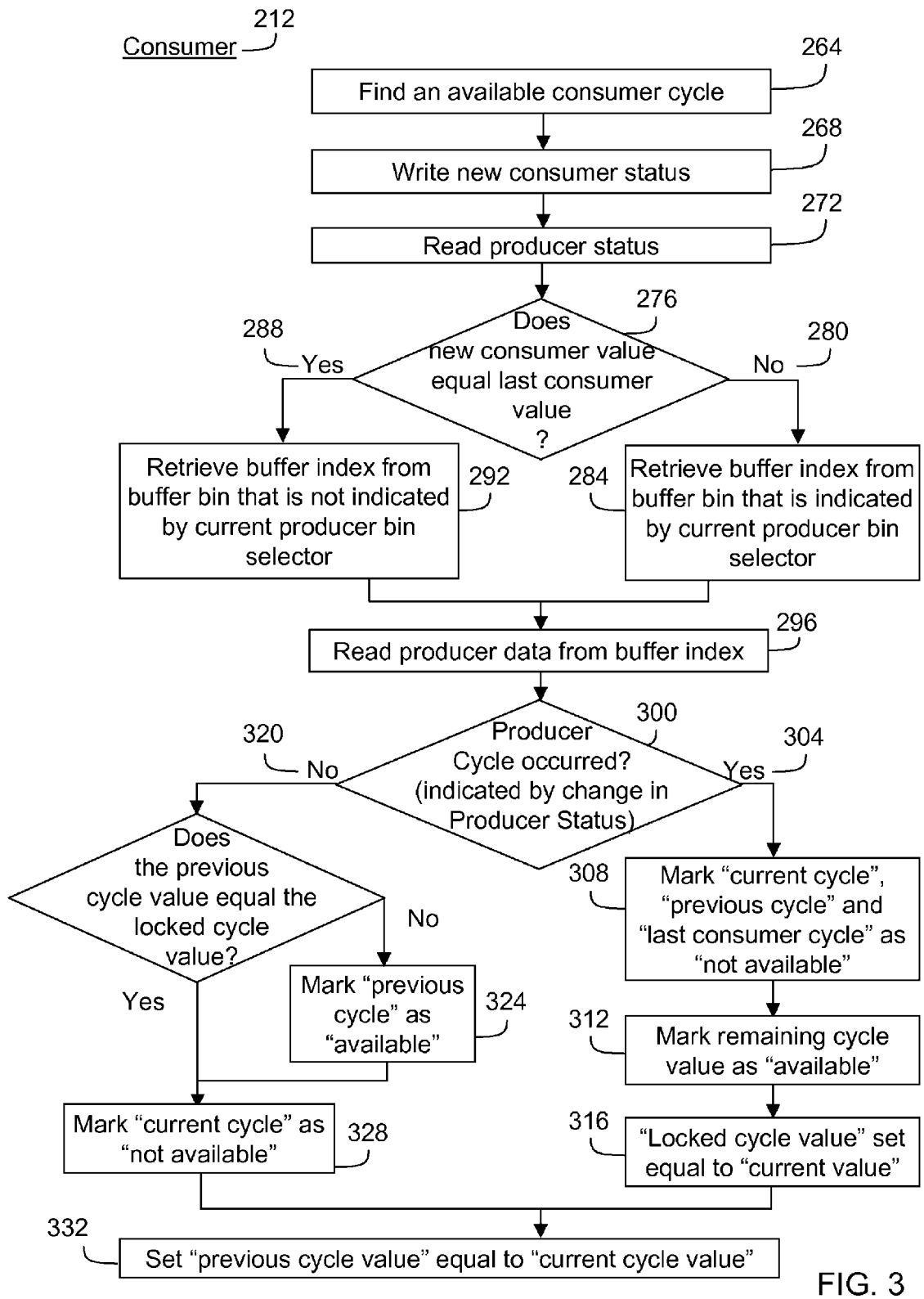

FIGS. 2 and 3 are a flowchart of an algorithm used for 4-buffer scanning between the producer and the consumer. In the exemplary embodiment, the algorithm includes a producer algorithm 208 (shown in FIG. 2) and a consumer algorithm 212 (shown in FIG. 3). During producer algorithm 208, the current buffer, previous buffer, and locked buffer variables are local instance variables of the producer and are not shared memory fields. These variables record one of four scan buffer index values 0, 1, 2, or 3. The producer's local instance data also records the current in-use state of each scan buffer. Before the first production cycle, all 4 scan buffers are available (not in use).

Accordingly, in the exemplary embodiment, the producer finds an available (not in use) scan buffer and saves 216 a buffer index value to the current buffer variable. The producer then writes 220 new production data to the current buffer offset location in the shared memory. A new producer status is created 224 by placing current buffer and locked buffer values into appropriate buffer bins for the current bin selector. An appropriate last consumer cycle value field is also set. Producer algorithm 208 also includes writing a producer status to the shared memory 225 and reading a consumer status from the shared memory 226.

In the exemplary embodiment, producer algorithm 208 determines 228 if the consumer cycle value has changed since the last production cycle. If the consumer cycle value has changed 232 (indicating a lock of the current buffer bin), the producer's bin selector is toggled 236 for the next production cycle. Accordingly, all production buffers are marked 240 'available' except for the current buffer and the previous buffer indexes. Moreover, the locked buffer value is set 244 to equal the current buffer value to save a new consumer locked buffer value. If no consumer cycle start has been detected 248 since the last production cycle (i.e., the value of the previous buffer equals the value of the locked buffer), the previous buffer index is marked 252 'available' and can be used on the next production cycle. Further, the current buffer index is marked 256 'not available' (in use) and cannot be used on next production cycle. Additionally, the previous buffer value is set 260 to equal the current buffer value for the next production cycle.

During consumer algorithm 212, the current cycle, previous cycle, and locked cycle variables are local instance variables of the consumer and not shared memory fields. These variables record one of the five cycle values 1, 2, 3, 4, or 5. The consumer's local instance data also records the current in-use state of each cycle value. Before the first consumption cycle, all 5 cycle values are available (not in use).

Accordingly, in the exemplary embodiment, the consumer finds 264 an 'available' (not in use) consumer cycle value and saves this value to the current cycle variable. The consumer also writes 268 a new consumer status to the shared memory with a new consumer cycle value and reads 272 the producer status from the shared memory. Consumer algorithm 212 then determines 276 if the new consumer cycle value equals the last consumer cycle value in the producer status. If the new consumer cycle value does not equal the last consumer cycle value 280, the consumer retrieves 284 the buffer index from the buffer bin that is indicated by the current producer bin selector. If the new consumer cycle value equals the last consumer cycle value 288, the producer has already seen the new consumer cycle and toggled its bin selector accordingly. Therefore, the consumer retrieves 292 the buffer index from a buffer bin that is not indicated by a current producer bin selector.

Next, the consumer reads 296 the producer data from the appropriate shared memory buffer offset indicated by the buffer index. Consumer algorithm 212 determines 300 if a producer cycle has occurred since the last consumer cycle (indicated by a change in the producer status). If a producer cycle has occurred 304, the consumer marks 308 the current cycle, previous cycle, and last consumer cycle value as 'not-available'. Further, the consumer marks 312 the remaining cycle values as 'available' (not in use). Moreover, the locked cycle value is set equal to the current cycle value to save the new locked cycle value. If the previous producer status value is equal to the current producer status (the producer cycle has not occurred 320), the consumer marks 324 the previous cycle value as 'available' if previous cycle does not equal locked cycle. Further, the current cycle value is marked 328 as 'not available' (in use) and cannot be used on the next consumption cycle. Moreover, the previous cycle value is set 332 equal to the current cycle value for the next consumption cycle.

Accordingly, producer algorithm 208 and consumer algorithm 212 minimize the backplane read/write accesses required to perform the scanning handshake. Specifically, both the producer and consumer require only a single write and a single read for the 4-buffer backplane handshake and an additional read or write of the actual I/O scan data. Additionally, the algorithm does not require any timeout and/or critical region in the software implementation.

In the exemplary embodiment, the producer is responsible for managing the availability or in-use status of the 4 scan buffers during production cycles. This management refers to the availability of currently unused scan buffers for production versus buffers made available for consumption. To perform this management, the producer must know which buffer the consumer currently has locked and which buffer was used in the last production cycle. The producer must then pick one of the remaining buffers for the current production cycle. Making this selection is slightly complicated by a race condition that occurs between the producer and the consumer. The race condition occurs when the producer writes a new buffer value to an anticipated current production buffer bin. While performing this production write, the consumer may be concurrently locking the same buffer bin the producer is writing and also reading the buffer value in this locked buffer bin. The producer does not know which buffer value the consumer actually saw in the buffer bin. The producer only knows it was either the new production buffer just written or the previous production buffer. Because of this race condition, the 4-Buffer algorithm requires the producer to assume both buffers are in use (both current and previous production buffers are marked in-use, but the two remaining buffers are implicitly available for use).

For example, if a producer had previously produced new data in buffer 1 and is now producing data in buffer 2, after updating the current buffer bin with value 2, the producer checks the consumer cycle value and sees that the consumer has previously locked the same buffer bin. The producer must now assume that both buffer 1 and buffer 2 are in use and are potentially being consumed. On the following production cycle, the producer is free to use either buffer 0 or buffer 3 for new producer data.

In the exemplary embodiment, the consumer cycle value field in the consumer status is intended to indicate the occurrence of a consumption cycle. A new consumption cycle is indicated by changing the consumer cycle value at the start of each consumption cycle. The producer sees the value change on its next production cycle and knows the consumption cycle has occurred or is in progress. A consumer must handle a few issues with the changing of the consumer cycle value. First, the consumer needs to change the cycle value with each consumption cycle, but it must not repeat a value that the producer may have seen during its previous production cycle. Thus, the consumer must keep track of what consumer cycle value was presented during the last cycle.

Second, the consumer must not use the cycle value that is currently presented in the producer status last consumer cycle value field. This cycle value must be avoided so the consumer can correctly compare producer and consumer cycle values in later consumer cycles. If this value were used and the producer did not cycle to change the last consumer cycle value before the consumer reused the same value, then the consumer would pick the wrong buffer bin with a consumer bin selection sub-algorithm.

Finally, a race condition must be handled when the consumer writes a new consumer cycle value and reads the producer status at the same time a producer is also writing a new producer status. In this case, the consumer is not sure which consumer cycle value was seen by the producer. Accordingly, the consumer must assume both the current cycle value and the previous cycle value are both in use and not available for the next consumer cycle. Essentially, this is the same race condition that the producer must handle, as described above.

With respect to the consumer cycle value, only four values are needed to present a unique value every cycle. However, because of a requirement that the producer's last consumer cycle value be avoided a consumer cycle value selection sub-algorithm requires 5 cycle values (value range 1-5). It should be noted that the consumer cycle values 1, 2, 3, 4, and 5 do not relate to buffer bins and are simply an indication to a producer that a new consumer cycle has occurred.

In the exemplary embodiment, the producer is required to copy the most recent consumer cycle value it sees into the producer status field last consumer cycle value during every production cycle. The consumer uses this value to determine which buffer bin it should read from. A fast producer may toggle its bin selector before the consumer reads the producer status. Accordingly, to make the proper buffer bin selection during a consumer cycle, the consumer compares the value of the producer status last consumer cycle value with the current consumer cycle value. If the values are not equal, the consumer uses the buffer bin indicated by the producer status bin selector value. However, if the cycle values are equal, then the consumer knows the producer has completed another cycle before the consumer reads its producer status value. Thus, the producer's bin selector has been toggled from the expected position and the consumer must use the locked buffer in the other buffer bin.

Accordingly, the system provides a producer that periodically updates its produced data and indicates a newest produced buffer to a consumer. Further, the consumer periodically locks a production buffer so that it can coherently read all data. The producer uses one of two buffer bins in shared memory to indicate the newest production buffer index value (buffer 0-3). The producer only writes new production buffer values to one bin at a time and indicates which bin is currently active using the producer bin selector field. When the consumer wants to access the most recently produced buffer, the consumer writes a new consumer cycle value to indicate the start of a new consumption cycle. With this action, the consumer commands the producer to stop writing new production buffers to the current bin and switch to the other bin on its next production cycle. This effectively locks the selected bin from further production cycle updates and allows the consumer to read the selected bin and use its buffer value for consumption.

Accordingly, the algorithm provides an I/O scan mechanism that is faster than previous software implementations. This is a technical improvement over previous algorithms, but it will also result in a product that has faster and more consistent scan times.

Further, in the exemplary embodiment, the basic 4-buffer algorithm includes several enhancements for use with the scanning mechanism 100. These enhancements facilitate supporting multiple remote modules and improving performance. Specifically, if multiple I/O buffer sets are required by the module then multiple sets can be implemented in the shared memory. Each buffer set includes the basic fields required for a single producer/consumer exchange namely consumer status, producer status, and four buffers bins. This basic set is then repeated multiple times in shared memory as needed for data exchange. The producer/consumer control status fields may be arranged in four shared memory arrays namely inputs consumer status array, inputs producer status array, outputs consumer status array, and outputs producer status array.

In the exemplary embodiment, the term scan index value refers to the array index where a particular set of control status fields are located for an I/O buffer set. For example, a scan index value of 5 means the corresponding producer/consumer status flags are located at array index 5 with each of the 4 control arrays, as follows:
Input Consumer Status=Inputs Consumer Offset[5]
Input Producer Status=Inputs Producer Offset[5]
Output Consumer Status=Outputs Consumer Offset[5]
Output Producer Status=Outputs Producer Offset[5]

In the exemplary embodiment, the system functions to control multiple remote I/O modules and partition scanning from a master controller. Accordingly, a set of producer and consumer status control fields is needed for each remote module. Specifically, during configuration the module must create a set of 4 I/O control arrays in shared memory for inputs consumer, inputs producer, outputs consumer, and outputs producer. Each array contains a list of either producer or consumer status fields for all modules.

During configuration the module must also identify the input and output data buffer offsets of each remote I/O module. A single buffer offset value points to a 4 buffer array used during 4-buffer scanning. A data size value will indicate the size of each scan buffer and also imply the offsets to each scan buffer in the array. For example, if a module's input data size is 12 bytes then the input buffers offset must point to 4 buffers of 12 bytes each located at offsets 0, 12, 24, and 36 within the buffer array. These buffers correspond to scan buffer indexes 0, 1, 2, and 3 in the 4-buffer scanning algorithm. The scanning algorithm and status fields can then be used to identify which scan buffer to use.

If a slave module supports multiple I/O buffer sets that are dynamically allocated based on configuration (e.g., remote module I/O scan data), then the system is responsible for properly allocating and presenting scan index values for the 4 control status arrays. Since I/O data sets can change with each configuration, control status fields and corresponding scan index values may be discarded or added with each configuration change. The system is responsible for properly handling assignments of scan index values for control status fields. Accordingly, the system attempts to keep assigned scan index values packed in the low range of index values. Thus, when the configuration adds new I/O data areas, the system reuses previously deallocated scan index locations before allocating new locations at the end of the status array. This may require the module to keep an internal or private scan index allocation array to determine which scan index locations are allocated and which are free.

In the exemplary embodiment, a consumer ready bit exists in the consumer status to indicate whether a consumer is ready. A producer can indicate its ready status using the buffer bin ready bits in each buffer bin (bin0 or bin1). The producer will set the buffer bin ready bit in the buffer bin for each production cycle with valid data. If the producer enters a state where it is not ready then the producer must either perform another production cycle without setting the buffer bin ready bit or simply clear the buffer bin ready bit in the previous production cycle's buffer bin. The consumer determines whether the production data it is consuming is valid based on the buffer bin ready bit in the buffer bin it has locked for consumption.

A master controller will indicate it is ready in the input consumer status during the first input scan and indicate outputs ready with the outputs producer status during the first output scan. When outputs are disabled the master controller must clear the buffer bin ready bit in the most recently produced buffer bin of the output producer status to appropriately indicate invalid output data. In one embodiment that utilizes an RX3i system, the master controller will also deassert the backplane RUN line.

Similarly, a slave module indicates input data is valid during its first production cycle with its inputs producer status. The slave module can also indicate it is ready to consume outputs with the consumer ready bit in the outputs consumer status.

In the exemplary embodiment, the slave module initializes particular fields during a startup sequence of the slave module. The remaining fields in the I/O scan setup block are sampled by the master module immediately following module configuration. This gives a module flexibility to change I/O scan data sizes and locations during configuration. If the master module has a static data size that does not change with configuration, the entire I/O scan setup block is initialized once during the startup sequence.

The exemplary embodiment also includes generating a producer status indicative of a production cycle of the first module, and writing the producer status to indicate a buffer bin from which the second module can read the data. The exemplary embodiment further includes generating a consumer status indicative of a consumption cycle of the second module, and writing the consumer status to indicate a buffer bin in which the first module can write the data.

In one embodiment, the method includes generating data during a first production cycle of the first module, and reading a consumer status indicative of a consumption cycle of the second module to determine a location to write production data for a second production cycle. In this embodiment, the method also includes generating data to a first buffer bin of a plurality of buffer bins during the first production cycle, and generating data to a second buffer bin of a plurality of buffer bins during the second production cycle.

In a further embodiment, the method includes reading data during a first consumer cycle of the second module, and reading a producer status indicative of a production cycle to determine whether new production data is available for a second consumer cycle. In this embodiment, the method also includes reading data from a first of a plurality of buffer bins during the first consumption cycle, and reading data from a second of the plurality of buffer bins during the second consumption cycle.

As used herein, an element or step recited in the singular and proceeded with the word a or an should be understood as not excluding plural said elements or steps, unless such exclusion is explicitly recited. Furthermore, references to one embodiment of the present invention are not intended to be interpreted as excluding the existence of additional embodiments that also incorporate the recited features.

Exemplary embodiments of systems and methods for exchanging data between a producer and a consumer are provided. The systems and methods illustrated are not limited to the specific embodiments described herein, but rather, components of the system may be utilized independently and separately from other components described herein. Further, steps described in the method may be utilized independently and separately from other steps described herein.

While the invention has been described in terms of various specific embodiments, those skilled in the art will recognize that the invention can be practiced with modification within the spirit and scope of the claims.

What is claimed is:

1. A method for exchanging data between a first module and a second module, said method comprising:
   generating a producer status at the first module, the producer status including an indication of a buffer bin;
   generating data at the first module into the indicated buffer bin, the first module configured to allow the second module to substantially continuously access the data;
   reading the producer status at the second module to determine the buffer bin from which the second module can read the data;
   reading the data at the second module from the indicated buffer bin, the second module configured to allow the first module to substantially continuously generate data; and
   exchanging the data between the first module and the second module upon reading the data.

2. A method in accordance with claim 1 further comprising:
   generating a consumer status indicative of a consumption cycle of the second module; and
   reading the consumer status to indicate a buffer bin in which the first module can write the data.

3. A method in accordance with claim 1 further comprising:
   generating data during a first production cycle of the first module; and
   reading a consumer status indicative of a consumption cycle of the second module to determine a location to write production data for a second production cycle.

4. A method in accordance with claim 3 further comprising:
   generating data to a first buffer bin of a plurality of buffer bins during the first production cycle; and
   generating data to a second buffer bin of the plurality of buffer bins during the second production cycle.

5. A method in accordance with claim 1 further comprising:
   reading data during a first consumer cycle of the second module; and
   reading a producer status indicative of a production cycle to determine whether new production data is available for a second consumer cycle.

6. A method in accordance with claim 5 further comprising:
   reading data from a first buffer bin of a plurality of buffer bins during the first consumer cycle; and
   reading data from a second buffer bin of the plurality of buffer bins during the second consumer cycle.

7. A system comprising:
   a controller; and
   an input/output module configured to exchange data with the controller over a shared memory interface, wherein the data is exchanged by:
   generating a status associated with a cycle of at least one of the first module and the second module, the status indicative of a specified buffer bin;
   generating the data with a first module into the specified buffer bin;
   reading the data at a second module from the specified buffer bin; and
   exchanging the data from the first module to the second module upon reading the data, wherein the first module is configured to allow the second module to substantially continuously access the data; and the second module is configured to allow the first module to substantially continuously generate the data.

8. A system in accordance with claim 7, wherein the data is further exchanged by:
   reading the status to indicate at least one of a first buffer bin from which the second module can read data and a second buffer bin to which the first module can generate data.

9. A system in accordance with claim 7, wherein the data is further exchanged by:
   writing data during a first production cycle of the first module; and
   reading a consumer status indicative of a consumption cycle of the second module to determine a location to write production data for a second production cycle.

10. A system in accordance with claim 9, wherein the data is further exchanged by:
    writing data to a first buffer bin of a plurality of buffer bins during the first production cycle; and
    writing data to a second buffer bin of a plurality of buffer bins during the second consumption cycle.

11. A system in accordance with claim 7, wherein the data is further exchanged by:
    reading data during a first consumer cycle of the second module; and reading a producer status indicative of a production cycle to determine whether new production data is available for a second consumer cycle.

12. A system in accordance with claim 11, wherein the data is further exchanged by:
reading data from a first buffer bin of a plurality of buffer bins during the first consumer cycle; and
reading data from a second buffer bin of the plurality of buffer bins during the second consumer cycle.

13. A computer program installed in an input/output module, said computer program comprising at least one code segment configured to instruct the input/output module to exchange data between a first module and a second module by:
generating a consumer status at the second module, the consumer status including an indication of a buffer bin;
reading the consumer status at the first module to determine the buffer bin in which the first module can write data;
generating data at the first module into the indicated buffer bin, the first module configured to allow the second module to substantially continuously access the data;
reading the data at the second module from the indicated buffer bin, the second module configured to allow the first module to substantially continuously generate data; and
exchanging the data between the first module and the second module upon reading the data.

14. A computer program in accordance with claim 13, wherein said computer program further comprises at least one code segment configured to instruct the input/output module to:
generate a producer status indicative of a production cycle of the first module; and
read the producer status to indicate a buffer bin from which the second module can read the data.

15. A computer program in accordance with claim 13, wherein said computer program further comprises at least one code segment configured to instruct the input/output module to:
generate data during a first production cycle of the first module; and
read a consumer status indicative of a consumption cycle of the second module to determine a location to write production data for a second production cycle.

16. A computer program in accordance with claim 15, wherein said computer program further comprises at least one code segment configured to instruct the input/output module to:
generate data to a first buffer bin of a plurality of buffer bins during the first production cycle; and
generate data to a second buffer bin of a plurality of buffer bins during the second production cycle.

17. A computer program in accordance with claim 13, wherein said computer program further comprises at least one code segment configured to instruct the input/output module to:
read data during a first consumer cycle of the second module; and
read a producer status indicative of a production cycle to determine whether new production data is available for a second consumer cycle.

18. A computer program in accordance with claim 17, wherein said computer program further comprises at least one code segment configured to instruct the input/output module to:
read data from a first buffer bin of a plurality of buffer bins during the first consumer cycle; and
read data from a second buffer bin of the plurality of buffer bins during the second consumer cycle.

* * * * *

UNITED STATES PATENT AND TRADEMARK OFFICE
CERTIFICATE OF CORRECTION

| | | |
|---|---|---|
| PATENT NO. | : 7,945,745 B2 | Page 1 of 1 |
| APPLICATION NO. | : 11/856210 | |
| DATED | : May 17, 2011 | |
| INVENTOR(S) | : Smith | |

It is certified that error appears in the above-identified patent and that said Letters Patent is hereby corrected as shown below:

In Column 10, Line 63, in Claim 10, delete "consumption" and insert -- production --, therefor.

Signed and Sealed this
Twenty-fifth Day of October, 2011

David J. Kappos
*Director of the United States Patent and Trademark Office*